US009256693B2

(12) United States Patent
Nice et al.

(10) Patent No.: US 9,256,693 B2
(45) Date of Patent: Feb. 9, 2016

(54) RECOMMENDATION SYSTEM WITH METRIC TRANSFORMATION

(71) Applicant: Rovi Technologies Corporation, Burbank, CA (US)

(72) Inventors: Nir Nice, Kfar Veradim (IL); Noam Koenigstein, Tel Aviv (IL); Ulrich Paquet, Cambridge (GB); Ran Gilad-Bachrach, Bellevue, WA (US); Liran Katzir, Tel Aviv (IL)

(73) Assignee: Rovi Technologies Corporation, Burbank, CA (US)

( * ) Notice: Subject to any disclaimer, the term of this patent is extended or adjusted under 35 U.S.C. 154(b) by 201 days.

(21) Appl. No.: 14/149,867

(22) Filed: Jan. 8, 2014

(65) Prior Publication Data

US 2015/0193548 A1   Jul. 9, 2015

(51) Int. Cl.
*G06F 17/30* (2006.01)
*G06F 7/00* (2006.01)

(52) U.S. Cl.
CPC .... *G06F 17/30876* (2013.01); *G06F 17/30557* (2013.01); *G06F 17/30675* (2013.01); *G06F 17/30864* (2013.01); *G06F 17/30867* (2013.01)

(58) Field of Classification Search
USPC ......................................................... 707/748
See application file for complete search history.

(56) References Cited

U.S. PATENT DOCUMENTS

| | | | | |
|---|---|---|---|---|
| 2005/0021517 | A1* | 1/2005 | Marchisio | G06F 17/20 |
| 2009/0299996 | A1 | 12/2009 | Yu | |
| 2012/0030159 | A1* | 2/2012 | Pilaszy | G06Q 10/00 706/46 |
| 2012/0030163 | A1* | 2/2012 | Zhong | G06F 17/30707 706/52 |
| 2014/0188865 | A1* | 7/2014 | Karatzoglou | G06Q 30/0282 707/732 |

* cited by examiner

*Primary Examiner* — Kuen Lu
(74) *Attorney, Agent, or Firm* — Ropes & Gray LLP (57) ABSTRACT

Example apparatus and methods transform a non-metric latent space produced by a matrix factorization process to a higher dimension metric space by applying an order preserving transformation to the latent space. The transformation preserves the order of the results of an inner product operation defined for the latent space. The higher dimension metric space may be queried for the results to different requests. Example apparatus and methods may assign every user i a vector $u_i$ in a latent space, and may assign every item j a vector $v_j$ in the latent space. The dot product $u_i \cdot v_j$ represents the score between the user i and the item j. The score represents the strength of the relationship between the user i and the item j. Example apparatus and methods may then apply ranking methodologies (e.g., LSH, K-D trees) to problems including recommendation, targeting, matchmaking, or item to item.

20 Claims, 8 Drawing Sheets

RECOMMENDATION SYSTEM WITH METRIC TRANSFORMATION

BACKGROUND

Conventional recommendation systems provide information about matches between users (e.g., shoppers) and items (e.g., books, videos, games) based on user interests, preferences, history, and other factors. For example, if a user has previously acquired (e.g., purchased, rented, borrowed) a set of items, then a recommendation system may identify similar items and recommend them to the user based on the user's own actions. Conventional recommendation systems may also determine similarities between users or between items and make additional recommendations based on those similarities. For example, if users in a certain demographic and with similar acquisition histories and preferences have acquired a set of items, then a recommendation system may identify items and recommend them to a user based on the actions of other users.

Conventional recommendation systems have employed matrix factorization models to map both users and items to a joint latent factor space of dimensionality f and to model user-item interactions as inner products in the joint factor space. An item may be associated with an item vector whose elements measure the extent to which the item possesses some factors. Similarly, a user may be associated with a user vector whose elements measure the extent of interest the user has in items that are high in corresponding factors. The dot product of the vectors may describe the interaction between the user and item and may be used to determine whether to make a recommendation. More specifically, every user i may be assigned a vector $u_i$ in a latent space, and every item j may also be assigned a vector $v_j$ in the latent space. The dot product $u_i \cdot v_j$ represents the score between the user i and the item j. The score represents the strength of the relationship between the user i and the item j.

When computing recommendations for a specific user i using matrix factorization, all the items j in the catalog are typically scored. After all the items j have been scored, the highest scoring items may be selected. This may be represented as: given i, find $j = \arg\max u_i \cdot v_j$. While scoring all the items j and then selecting the highest scoring items provides useful recommendation results, the time required to score all items j and then select the highest scoring items j may consume an unacceptable number of processor cycles and may take an unacceptably long period of time. Additionally, computing all the scores for $u_i \cdot v_j$ only provides information useful to solve the problem: given i, find $j' = \arg\max u_i \cdot v_j$ and provides no information useful for other tasks.

In mathematics, arg max is the argument of the maximum, which is defined as the set of points of the given argument for which the given function attains its maximum value.

$$\underset{x}{\arg\max} f(x) := \{x \mid \forall y : f(y) \leq f(x)\}$$

In other words, $\arg\max_x f(x)$ is the set of values of x for which f(x) attains its largest value M. For example, if f(x) is $1-|x|$, then it attains its maximum value of 1 at x=0 and only there, so arg max, $(1-|x|)\{0\}$.

A recommendation system may want to study and quantify other relationships. For example, a recommendation system may want to find the highest scoring user given a specific item. This may be referred to as the targeting problem and may be described by: given j, find $i^* = \arg\max u_i \cdot v_j$. A recommendation system may also want to find the highest scoring user given another user. This may be referred to as the matching problem and may be described by: given i, find $k^* = \arg\max u_i \cdot u_k$. A recommendation system may also want to find the highest scoring item given another item. This may be referred to as the item-to-item problem and may be described by: given j, find $m^* = \arg\max v_j \cdot v_m$. Seen together, the different results sought by a user/item recommendation system may include:

User-to-item: (given i, find $j^* = \arg\max u_i \cdot v_j$)
Targeting: (given j, find $i^* = \arg\max u_i \cdot v_j$)
Matchmaking: (given i, find $k^* = \arg\max u_i \cdot u_k$)
Item to Item: (given j, find $m^* = \arg\max v_j \cdot v_m$).

Unfortunately, in conventional systems, computing a score for one result provides no information for computing a score for another result. Thus, the processor cycle consumption and resulting time required may increase even more when multiple solutions are solved for the same item or user. Thus, some conventional systems have attempted to perform faster scoring using, for example, retrieval methodologies that query the latent space that spans from matrix factorization. However, these conventional attempts have failed because the latent space is not metric.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods transform a non-metric latent space to a metric space using an order preserving transformation. The transform produces a higher dimension metric space from the latent space produced by a matrix factorization process. The transformation preserves the order of the results of an inner product operation defined for the latent space so that the maximizer of an inner-product operation between two vectors in the latent space is a minimizer of a distance (e.g., Euclidean) between two corresponding vectors in the metric space. The higher dimension metric space may then be queried for the results to different requests. Example apparatus and methods may assign every user i a vector $u_i$ in a latent space, and may assign every item j a vector $v_j$ in the latent space. The dot product $u_i \cdot v_j$ represents the score between the user i and the item j. The score represents the strength of the relationship between the user i and the item j. Example apparatus and methods may then apply fast nearest-neighbor methodologies (e.g., LSH, K-D trees) to problems including recommendation, targeting, matchmaking, or item to item.

In one example, an apparatus includes a memory that stores data representing vectors in an N-dimensional non-metric latent space and representing vectors in an M-dimensional metric space. The N-dimensional non-metric latent space is produced by matrix factorization and the M-dimensional metric space is produced from the N-dimensional non-metric latent space using an order-preserving transform. The apparatus includes logic for performing matrix factorization on first entities and second entities to produce the N-dimensional non-metric latent space in which the first entities and the second entities are embedded. The apparatus also includes logic for producing the M-dimensional metric space from the non-metric latent space by performing an order preserving transform on the non-metric latent space. The order preserving transform preserves the order by causing a maximizer of an inner-product operation between two vectors in the latent space to be a minimizer of a distance between two corresponding vectors in the metric space.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods provide a recommendation system that performs fast ranking in a metric space. In one embodiment, a non-metric latent space associated with a matrix factorization process is created by assigning to a user i a vector $u_i$ in the latent space and by assigning to an item j a vector $v_j$ in the latent space. Vectors may be assigned for multiple different users and multiple different items. Rather than score all user-to-item relationships in the non-metric latent space in an attempt to find a highest scoring relationship, example apparatus and methods transform the non-metric latent space to a higher dimension metric space in a way that preserves order of the results of an inner product operation that could be performed in the latent space. With the higher dimension metric space available, example apparatus and methods may then apply fast scoring methodologies (e.g., LSH, K-D trees) to the higher dimension metric space to retrieve a subset of rankings from which a recommendation can be made. The rankings may include, for example, user-to-item ranking: (given i, find j*=arg max $u_i \cdot v_j$), a targeting ranking: (given j, find i*=arg max $u_i \cdot v_j$), a matchmaking ranking: (given i, find k*=arg max $u_i \cdot u_{k'}$), or item-to-item ranking: (given j, find m*=arg max $v_j \cdot v_m$). A recommendation may then be made from the rankings. In one embodiment, if an exact score is desired before making a recommendation, then the exact score for an item in the rankings may be produced by computing the score in the original non-metric latent space. The exact score may be desired to confirm that a recommendation exceeds a threshold value.

In computer science, a k-dimensional tree (k-d tree) is a space-partitioning data structure for organizing points in a k-dimensional space. k-d trees are used in applications including searches involving a multidimensional search key (e.g. range searches and nearest neighbor searches). k-d trees are a special case of binary space partitioning trees. A k-d tree may be implemented as a binary tree where nodes are k-dimensional points.

In computer science, local sensitivity hashing (LSH) is a method of performing probabilistic, dimension reduction of high-dimensional data. LSH involves hashing the input items so that similar items are mapped to the same buckets with high probability. The number of buckets is controlled to be much smaller than the universe of possible input items. LSH differs from conventional hash functions, (e.g., cryptographic hashes) since the goal for LSH is to maximize the probability of "collisions" of similar items rather than to avoid collisions. Locality-sensitive hashing performs functions similar in some ways to data clustering and nearest neighbor searching.

More generally, example apparatus and methods use matrix factorization to build a latent space in which a first entity and a second entity (e.g., users, items) are embedded. Factorization concerns analyzing unobserved variables by, for example, making inferences. Factor analysis may include performing a statistical method to describe the variability among observed, correlated variables in terms of factors. In the user and item example, a user may have observable preferences while items may have latent factors.

Figure 1:
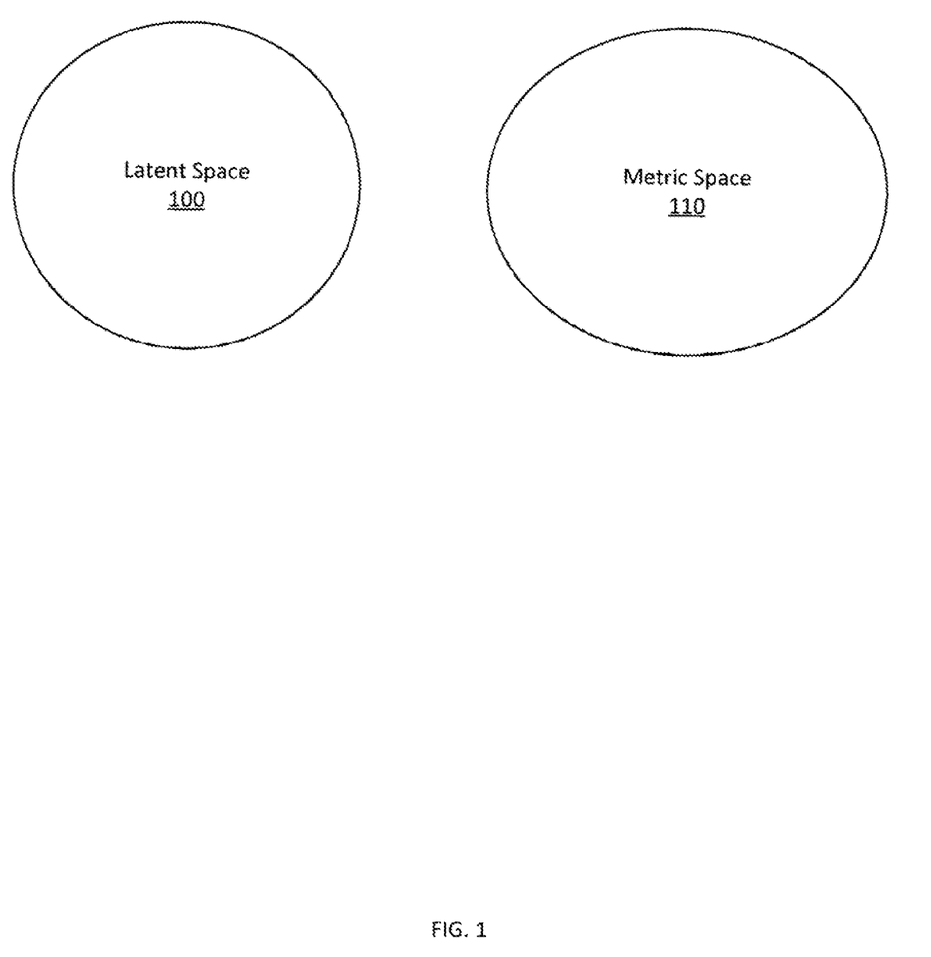
FIG. 1 is a Venn diagram illustrating a relationship between example vector spaces and example metric spaces.

The latent space that is built using matrix factorization is not metric. A metric space is a space where a notion of distance between items adheres several properties triangle inequality or the identity property. FIG. 1 illustrates the separation between the latent space 100 built using matrix factorization and a metric space 110.

Figure 2:
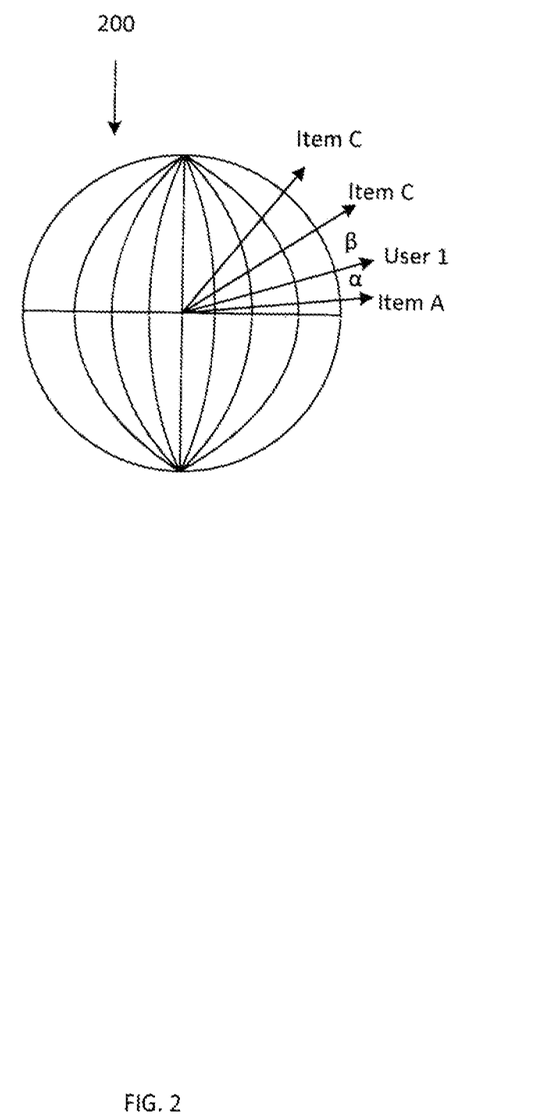
FIG. 2 illustrates an example metric space.

FIG. 2 illustrates a metric space 200 where the distance between items is defined. For example, the distance between a first vector and a second vector may be measured by angle α and the distance between the second vector and a third vector can be measured by β. While distance is illustrated being measured by angles, other distance measuring approaches may be applied.

Example apparatus and methods may apply an order preserving transformation to the latent space to produce a higher dimension metric space. For example, an N dimensional latent space may be transformed into an N+2 dimensional metric space. Ranking approaches may then be applied to the metric space to find relevant candidates that are located in a neighborhood defined by a distance. The rankings may produce results for different queries relating a first entity to second entities, a first entity to another first entity, a second entity to first entities, or a second entity to other second entities. Relevant candidates produced by the ranking approaches may be scored in the latent space to retrieve a true original score.

Unlike conventional systems that operate in a non-metric latent space and that compute scores for all possible combinations of entities in that non-metric latent space to produce data from which a recommendation can be produced, example systems and methods may quickly select a small subset of candidates from the transformed metric space and score the small subset to produce a ranking for members of the small subset. Selecting a small subset rather than computing scores for all possible combinations of entities reduces processor cycles consumed and thus reduces the amount of time required to produce a recommendation.

In one embodiment, a first step involves producing the latent space. Producing the latent space involves identifying the items to be related in the latent space and then embedding those items in the latent space. For example, given a set of user-item relationships, matrix factorization may be used to generate an N dimension latent space in which the users and items are embedded. The latent space may be considered to be a vector space, where a vector space is defined as a set of vectors, a set of scalars, and a scalar multiplication operation that takes a scalar k and a vector v and produces another vector kv.

In one embodiment, a second step involves transforming the non-metric latent space into a metric space by using an order preserving mapping. In one embodiment, the order preserving mapping may produce an N+2 dimension metric space in which the user and item vectors are embedded. While an N+2 dimension metric space is described, different dimensionalities may be employed in different examples. A transform may be a mapping between two vector spaces where a set of rules define how to map from one vector space to the other vector space.

In one embodiment, a third step involves preparing the N+2 dimension metric space for fast scoring or fast retrieve where less than all pairs of user/items need to be scored. Unlike the non-metric space where there is no information about the distance between entities, the metric space has information about the distance between entities and that distance information can be used to select a subset of items to score. Selecting a subset of items to score based on the distance information may reduce the number of computations required to produce a recommendation. In one embodiment, preparing the N+2 dimension metric space for fast scoring may include building a local sensitivity hash function (LSH). In another embodiment, preparing the N+2 dimension metric space for fast scoring may include building a K-D tree for the space. Other techniques for performing fast searches in a metric space may be employed.

In one embodiment, a fourth step involves performing fast scoring in the N+2 dimension metric space. The scoring may be applied to a user-to-item query, a user-to-user query, an item-to-user query, or an item-to-item query. Rather than scoring all pairs of entities in the non-metric space, a fast scoring technique may score a subset of items falling within a distance threshold in the N+2 dimension metric space. In one embodiment, the distance threshold may be configurable to include more or less candidates in the subset of items. A ranked list may be generated from the scores produced for members of the subset. A recommendation may then be made from the ranked list. While a list is described, rankings may be stored or presented in other data structures or displays.

In one embodiment, a fifth step may involve going back to the original latent space to determine a true original score for an item in the rankings. True original scoring may be performed before providing a recommendation. For example, even though an item received the highest score in the rankings, the true original score may be below a threshold score for making a recommendation. Thus, in one embodiment, a true original score may be computed for an item using the latent space and then a recommendation may only be made if the true original scar is above a threshold.

Assume users are represented by vectors $u_1, \ldots, u_n$ and items are represented by vectors $v_1, \ldots, v_m$. A first goal (Goal I) may be described by: given i, find $j^* = \arg\max u_i \cdot v_j$. A second goal (Goal II) may be described by: given i, find $k^* = \arg\max u_i \cdot u_k$. A third goal (Goal III) may be described by: given j find $i^* = \arg\max u_i \cdot v_j$. A fourth goal (Goal IV) may be described by: given j find $m^* + = \arg\max v_j \cdot v_m$.

In one embodiment, the order preserving mapping may include assumptions, definitions, and embedded functions. The order preserving mapping or transform may assume that the real space R is such that $R_u \geq \max \|u_i\|$ and $R^v \geq \max \|v_j\|$. With this assumption in place, construction of the higher dimension metric space includes the following relations in the mapping:

$$\hat{u}_i = (0, \sqrt{R_u^2 - \|u_i\|^2}, u_i)$$

$$\hat{v}_j = (\sqrt{R_v^2 - \|v_j\|^2}, 0, v_j).$$

Examination of the embedding reveals that $\|\hat{u}_i\| = R_u$ and $\|\hat{v}_j\| = R_v$. Given that $\|\hat{u}_i\| R^u$ and $\|\hat{v}_j\| R^v$, it follows logically that:

$$\|\hat{u}_i - \hat{v}_j\|^2 = \|\hat{u}_i\|^2 + \|\hat{v}_j\|^2 - 2u_i \cdot v_j = R_u^2 + R_v^2 - 2u_i \cdot v_j.$$

Therefore, in this example embedding, which may be used to transform the non-metric latent space to the higher dimension metric space, the minimizer of the Euclidean distance is the maximizer of the inner-product. Establishing this relationship between the minimizer of the Euclidean distance and the maximizer of the inner-product facilitates solving Goal I and Goal III. Once Goal I and Goal III have been solved, it may be possible to address Goal II by embedding $$\bar{u}_i = ((0, 0, u_i)$$

and noting that:

$$\|\bar{u}_i - \hat{u}_{i'}\|^2 = \|u_i\|^2 + R_u^2 - 2u_i \cdot u_{i'}.$$

Thus, if i is fixed, and a search on i' is performed, the minimizer of the Euclidean distance between $\bar{u}_i$ and $\widehat{u_{i'}}$ is the maximizer of the inner product since $\|u_i\|$ is fixed. Understanding that $\|u_i\|$ is fixed provides information for solving Goal IV. In the same fashion that $\bar{u}_i = (0, 0, u_i)$ was defined, it is possible to define $\bar{v}_j = (0, 0, v_j)$ to solve Goal IV. While Euclidean distance is described, other distance definitions may be employed.

While four queries associated with a user-item recommendation system are described, the transformation may be applied more generally. For example, systems that use non-metric latent spaces produced by matrix factorization other than recommendation systems may also be manipulated with an order preserving transform to produce a higher dimensional metric space. The order that is preserved may be the order of an inner product computation. The higher dimensional metric space may more generally by processed using fast-retrieval in a space where a score depends on an inner product that can be ranked in the metric space based on distance.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
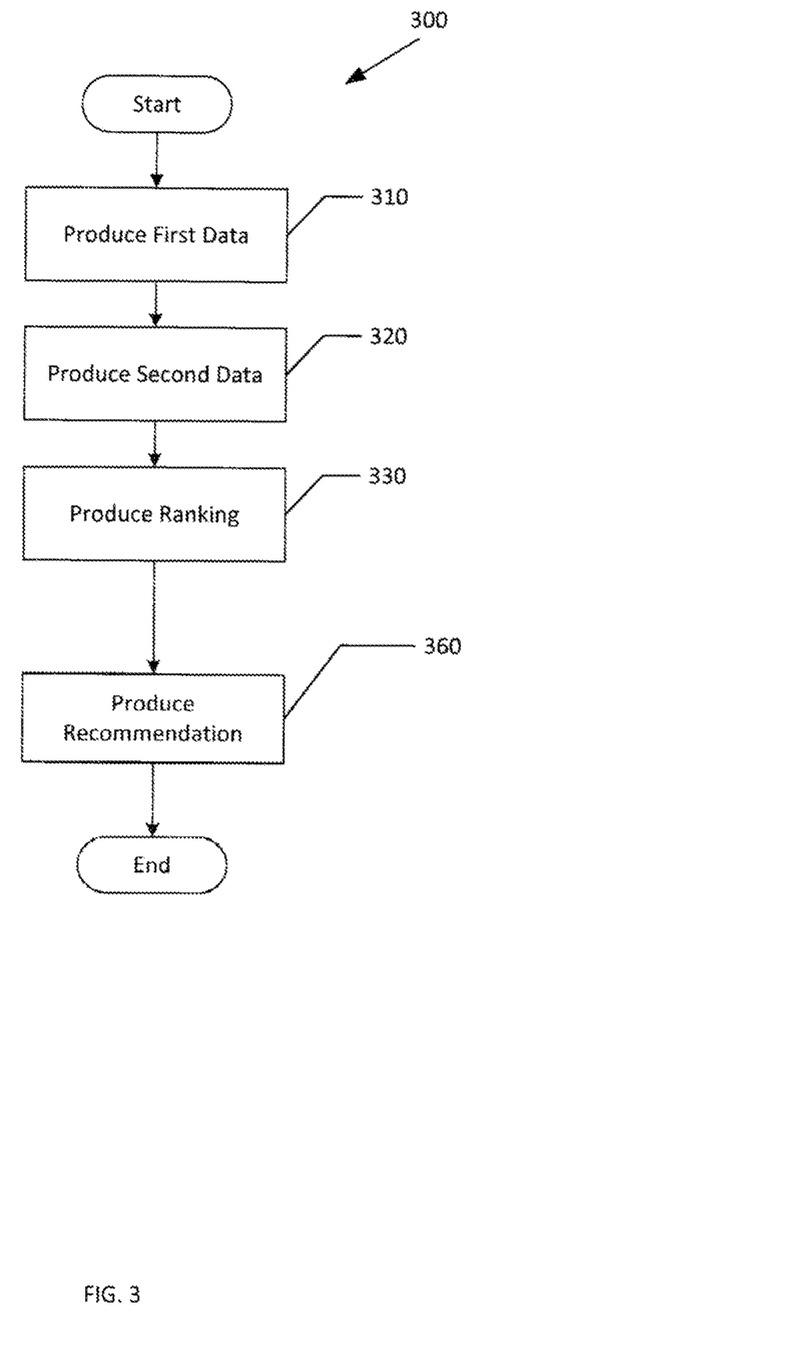
FIG. 3 illustrates an example method associated with transforming a latent space associated with matrix factorization into a higher dimension metric space where an order associated with an inner product in the latent space is preserved and in which fast scoring may be applied in an improved time period.

FIG. 3 illustrates an example method 300 associated with transforming a non-metric latent space produced by matrix factorization to a metric space where an inner-product order from the latent space is preserved as Euclidean distance in the metric space. In its basic form, when applied to a user-item recommendation system, matrix factorization characterizes both items and users by vectors of factors inferred from rating information, behavior, or other information. In a matrix of dimensionality f, each user may be associated with a vector $q_i \in R^f$ and each item may be associated with a vector $p_u \in R^f$. Thus, for a given item, the elements of a vector representing the item measure the extent to which the item possesses the factors that form the dimensions in the matrix. For a given user, the elements of a vector representing the user measure the extent of interest the user has in items that are high on the corresponding factors. The resulting inner product of the user vector and item vector captures the interaction between the user and item. Thus, as used herein, "vector" refers to an element of a matrix of dimensionality f, where the vector describes an object with respect to the factors that are the dimensions of the matrix.

Method 300 may include, at 310, producing first data associated with a non-metric latent space. In one embodiment, the data associated with the non-metric latent space is produced using a matrix factorization process for vectors associated with users and vectors associated with items. More generally, the latent space may be produced using a matrix factorization process for vectors associated with two related objects. In one embodiment, the matrix factorization process includes assigning a user i of F users a vector $u_i$ in the latent space and assigning an item j of G items a vector $v_j$ in the latent space. i, j, F, and G are integers. i is less than or equal to F and j is less than or equal to G. The elements of a vector measure the extent to which the entity associated with the vector possesses the factors associated with the dimensions in the matrix. Producing the data includes storing electronic values in an apparatus which involves changing the physical state of one or more portions of a physical computer memory.

Method 300 may also include, at 320, producing second data associated with a metric space. The metric space is produced from the non-metric latent space by applying a vector space transform to the latent space. The transform preserves in the metric space the order of an inner product operation defined for the latent space. Recall that the inner product between, for example, a user and an item captured the relationship between the user and the item. Thus, preserving the order of the inner product operation as a distance (e.g., Euclidean) in a metric space facilitates quickly finding relevant pairs of vectors for providing recommendations. In one embodiment, the metric space has a higher dimensionality than the non-metric space. Producing the data includes storing electronic values in an apparatus which involves changing the physical state of one or more portions of a physical computer memory.

Method 300 may also include, at 330, producing a ranking for a selected number of vector combinations in the higher dimension metric space. Recall that in conventional matrix factorization an unacceptable number of processor cycles were consumed calculating scores for all possible pairs in the latent space. With the inner product relationship retained in the Euclidean distance, only pairs of vectors that will produce results within a certain range of values may need to be processed. Thus, in one embodiment, the selected number of vector combinations is configured to cover less than a configurable percentage of the metric space. In one embodiment, the percentage of the metric space may be user configurable.

In one embodiment, the ranking is a function of a scoring process applied to the vectors. The scoring process may depend, at least in part, on the Euclidean distance between vectors in the metric space. The rankings may be associated with evaluating a user-to-item relation, a targeting relation, a matchmaking relation, or an item to item relation. Understanding that the inner product order is preserved as distance between vectors in the metric space facilitates reducing identifying the highest scored relationships to finding the vectors closest to a reference vector.

Method 300 may also include, at 360, producing the recommendation based, at least in part, on the rankings of the selected number of vector combinations. For example, the highest ranked pair of vectors may be used to produce the recommendation, the highest x ranked pairs may be used (x being an integer), the top y percent may be used, or other selection threshold criteria may be employed.

To preserve the ordering, the vector space transform may cause a maximizer of an inner-product operation between two vectors in the latent space to be a minimizer of a Euclidean distance between two corresponding vectors in the metric space. Performing the transform in this order-preserving fashion may rely on the vector space transform operating in a real space R where $R_u \geq \max \|u_i\|$ and $R_v \geq \max \|v_j\|$. To preserve the order, the vector space transform may operate as controlled by:

$$\hat{u}_i = (0, \sqrt{R_u^2 - \|u_i\|^2}, u_i) \text{ and } \hat{v}_j = (\sqrt{R_v^2 - \|v_j\|^2}, 0, v_j).$$

To preserve the order, the transform may assume $\|\hat{u}_i\| = R_u$ and $\|\hat{v}_j\| = R_v$, and thus may be controlled by $\|\hat{u}_i - \hat{v}_j\|^2 = \|\hat{u}_i\|^2 + \|\hat{v}_j\|^2 - 2\hat{u}_i \cdot \hat{v}_j = R_u^2 + R_v^2 - 2\bar{u}_i \cdot \bar{v}_j$, where $\bar{u}_i$ is defined as $(0,0,u_i)$ and $\bar{v}_j$ is defined as $(0,0,v_j)$.

Figure 4:
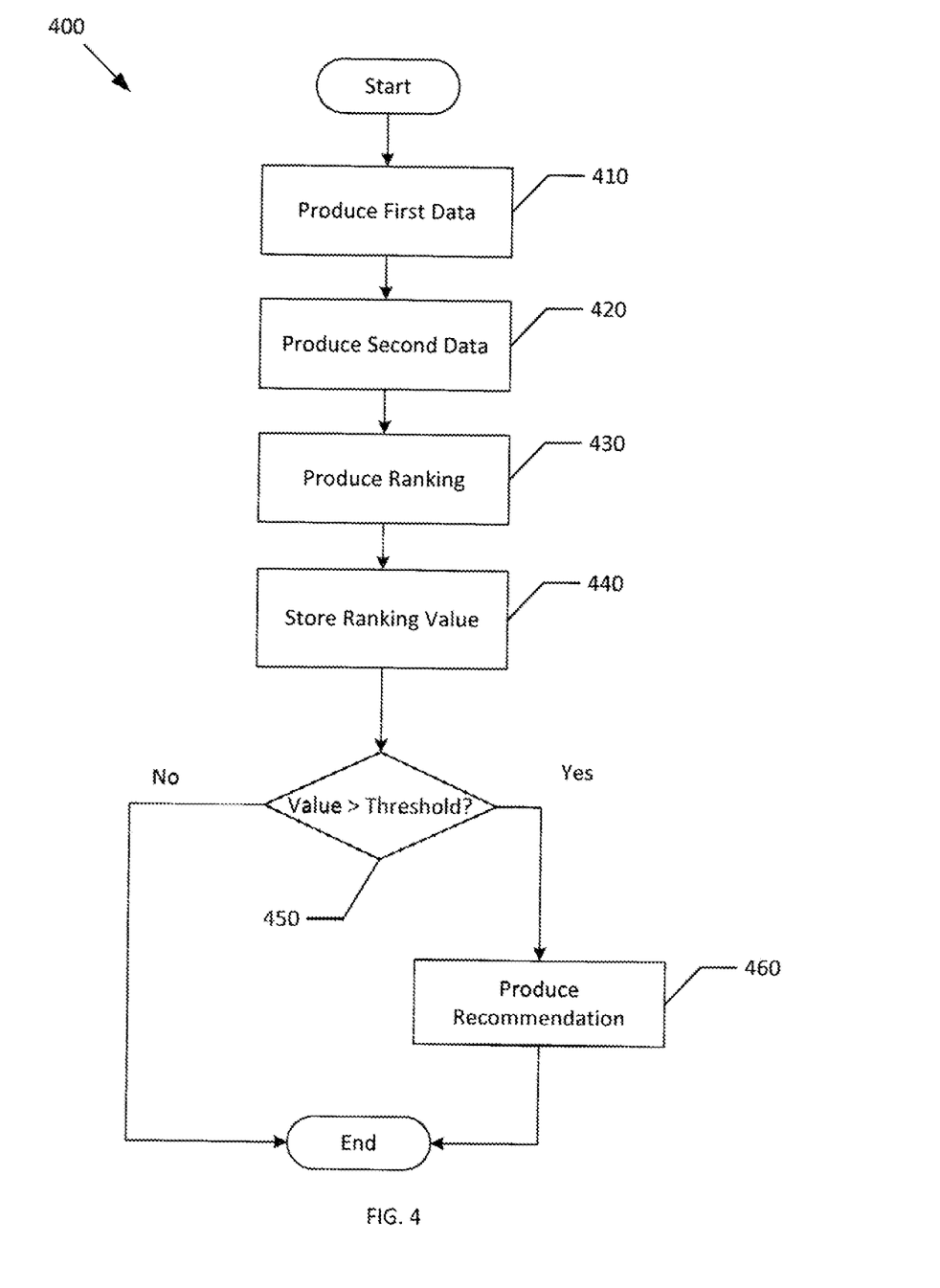
FIG. 4 illustrates an example method associated with transforming a latent space associated with matrix factorization into a higher dimension metric space where an order associated with an inner product in the latent space is preserved and in which fast scoring may be applied in an improved time period.

FIG. 4 illustrates an example method 400 associated with transforming a non-metric latent space produced by matrix factorization to a metric space where an inner-product order from the latent space is preserved as Euclidean distance in the metric space. Method 400 includes several actions similar to those described in connection with method 300 (FIG. 3). For example, method 400 includes producing first data at 410, producing second data at 420, producing a ranking at 430, and producing a recommendation at 460. However, method 400 also includes additional actions.

For example, method 400 includes, at 440, storing a value for the ranking. Storing the value for the ranking may include updating a computer memory, a register, or other electronic data store. In one embodiment, the value is computed by performing an inner product operation on vectors associated with the ranking using vectors stored in the latent space. This extra step may be taken when the fact that an item was in the highest ranked items is insufficient to make a recommendation. Just because an item scored highest and was closest to the reference vector in the metric space doesn't mean that the item scored well. Thus, method 400 also includes, at 450, determining whether the value exceeds a recommendation threshold. If the determination is yes, then method 400 proceeds, at 460, to produce the recommendation. But if the determination is no, then method 400 may not make the recommendation.

While FIGS. 3 and 4 illustrates various actions occurring in serial, it is to be appreciated that various actions illustrated in FIGS. 3 and 4 could occur substantially in parallel. By way of illustration, a first process could maintain a latent space associated with matrix factorization, a second process could maintain a metric space produced using the order-preserving transform, and a third process could produce rankings, scores, and recommendations. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non volatile media may include, for example, optical disks, magnetic disks, tapes, flash memory, read only memory (ROM), and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, a compact disk (CD), a random access memory (RAM), a read only memory (ROM), a memory chip or card, a memory stick, and other media from which a computer, a processor or other electronic device can read.

Figure 5:
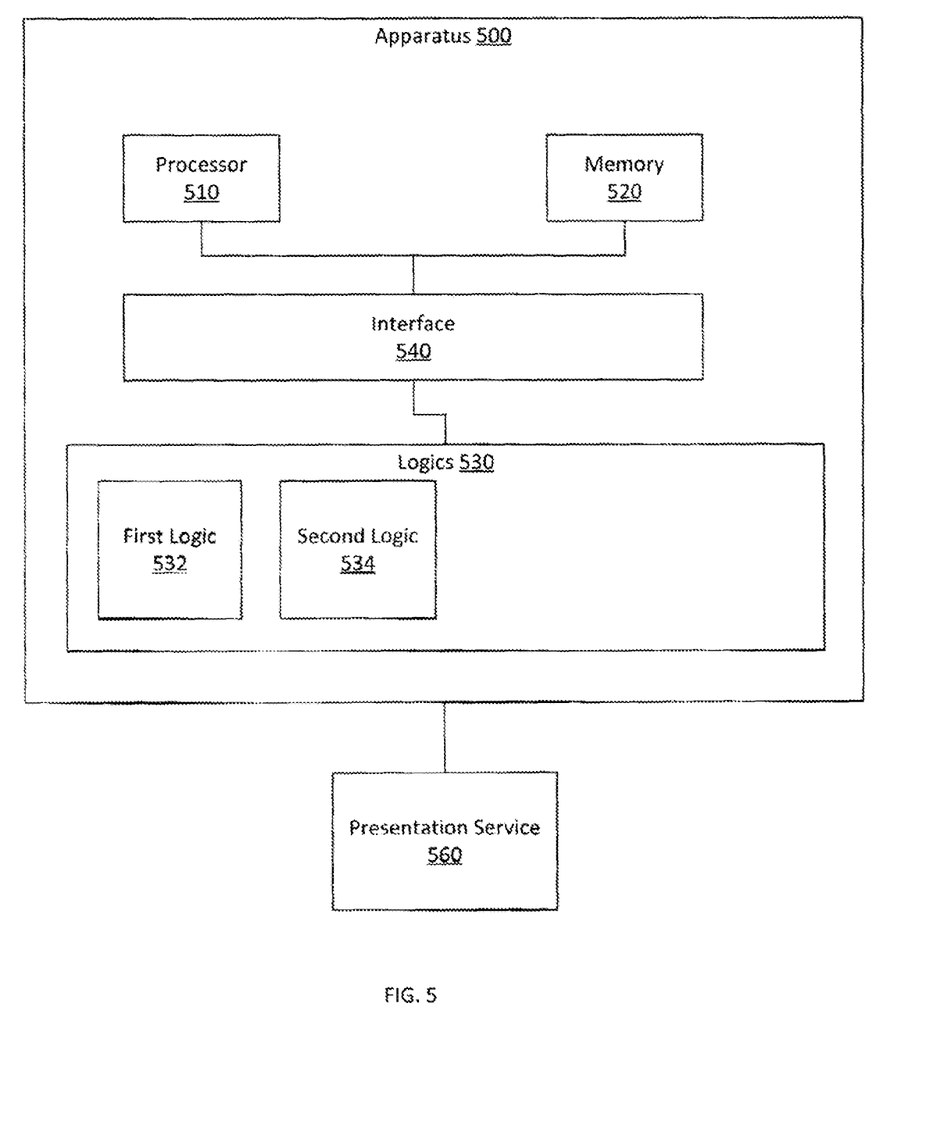
FIG. 5 illustrates an example apparatus associated with transforming a latent space associated with matrix factorization into a higher dimension metric space where an order associated with an inner product in the latent space is preserved and in which fast scoring may be applied in an improved time period.

FIG. 5 illustrates an apparatus 500 that includes a processor 510, a memory 520, a set 530 of logics, and an interface 540 that connects the processor 510, the memory 520, and the set 530 of logics. The processor 510 may be, for example, a microprocessor in a computer, a specially designed circuit, a field-programmable gate array (FPGA), an application specific integrated, circuit (ASIC), a processor in a mobile device, a system-on-a-chip, a dual or quad processor, or other computer hardware. The memory 520 may store data representing vectors in an N-dimensional non-metric latent space and may store data representing vectors in an M-dimensional metric space, where N is an integer greater than two, and M is an integer greater than N. While a single memory 520 is illustrated, in one embodiment, data associated with the non-metric latent space may be stored in one memory or data store while data associated with the metric space may be stored in a second memory or data store.

In one embodiment, the apparatus 500 may be a general purpose computer that has been transformed into a special purpose computer through the inclusion of the set 530 of logics. Apparatus 500 may interact with other apparatus, processes, and services through, for example, a computer network. Apparatus 500 may be, for example, a computer, a laptop computer, a tablet computer, a personal electronic device, a smart phone, a system-on-a-chip (SoC), or other device that can access and process data.

The set 530 of logics may be configured to transform a non-metric latent space to a metric apace while preserving an ordering produced by an inner product operation defined for the non-metric latent space. The set 530 of logics may include a first logic 532 that is configured to perform matrix factorization on first entities and second entities. The matrix factorization may produce the N-dimensional non-metric latent space in which the first entities and the second entities are embedded. In one embodiment, producing the N-dimensional non-metric latent space includes storing data representing a vector in the memory. Recall that the elements of a vector measure the extent to which the entity (e.g., user, item) associated with the vector possesses the factors associated with the dimensions in the matrix.

In one embodiment, the first entities represent users and the second entities represent items. In this embodiment, the users are represented by vectors $u_1, \ldots, u_n$ and the items are represented by vectors $v_1, \ldots, v_m$ where n is an integer representing the number of items and m is an integer representing the number of users.

The set 530 of logics may also include a second logic 534 that is configured to produce the M-dimensional metric space from the non-metric latent space. The M-dimensional metric space, which is a higher dimensionality space, may be produced by performing an order preserving transform on the non-metric latent space. In one embodiment, producing the M-dimensional metric space includes storing data representing a vector in the memory 520. In one embodiment, the second logic 534 is configured to perform the order preserving transform by causing a maximizer of an inner-product operation between two vectors in the latent space to be a minimizer of a Euclidean distance between two corresponding vectors in the metric space.

In one embodiment, the second logic 534 is configured to perform the order preserving transform by processing a real space R where $R_u \geq \max\|u_i\|$ and $R_v \geq \max\|v_j\|$. In one embodiment, the second logic 534 is configured to perform the order preserving transform as controlled by the definition of $\hat{u}_i$ and $\hat{v}_j$ as:

$$\hat{u}_i = (0, \sqrt{R_u^2 - \|u_i\|^2}, u_i)$$

$$\hat{v}_j = (\sqrt{R_v^2 - \|v_j\|^2}, 0, u_j)$$

where $\|\hat{u}_i\| = R_u$ and $\|\hat{v}_j\| = R_v$.

In one embodiment, the second logic 534 is configured to perform the order preserving transform as controlled by:

$$\|\hat{u}_i - \hat{v}_j\|^2 = \|\hat{u}_i\|^2 + \|\hat{v}_j\|^2 - 2u_i \cdot v_j = R_u^2 + R_v^2 - 2u_i \cdot v_j.$$

where
$\overline{u}_i$ this defined as $(0,0,u_i)$ and $\overline{v}_j$ is defined as $(0,0,v_j)$.

In different embodiments, some processing may be performed on the apparatus 500 and some processing may be performed by an external service or apparatus. Thus, in one embodiment, apparatus 500 may also include a communication circuit that is configured to communicate with an external source. In one embodiment, the set of logics 530 may interact with a presentation service 560 to facilitate displaying data using different presentations for different devices. For example, information describing items that are recommended to a user may be presented by presentation service 560.

Figure 6:
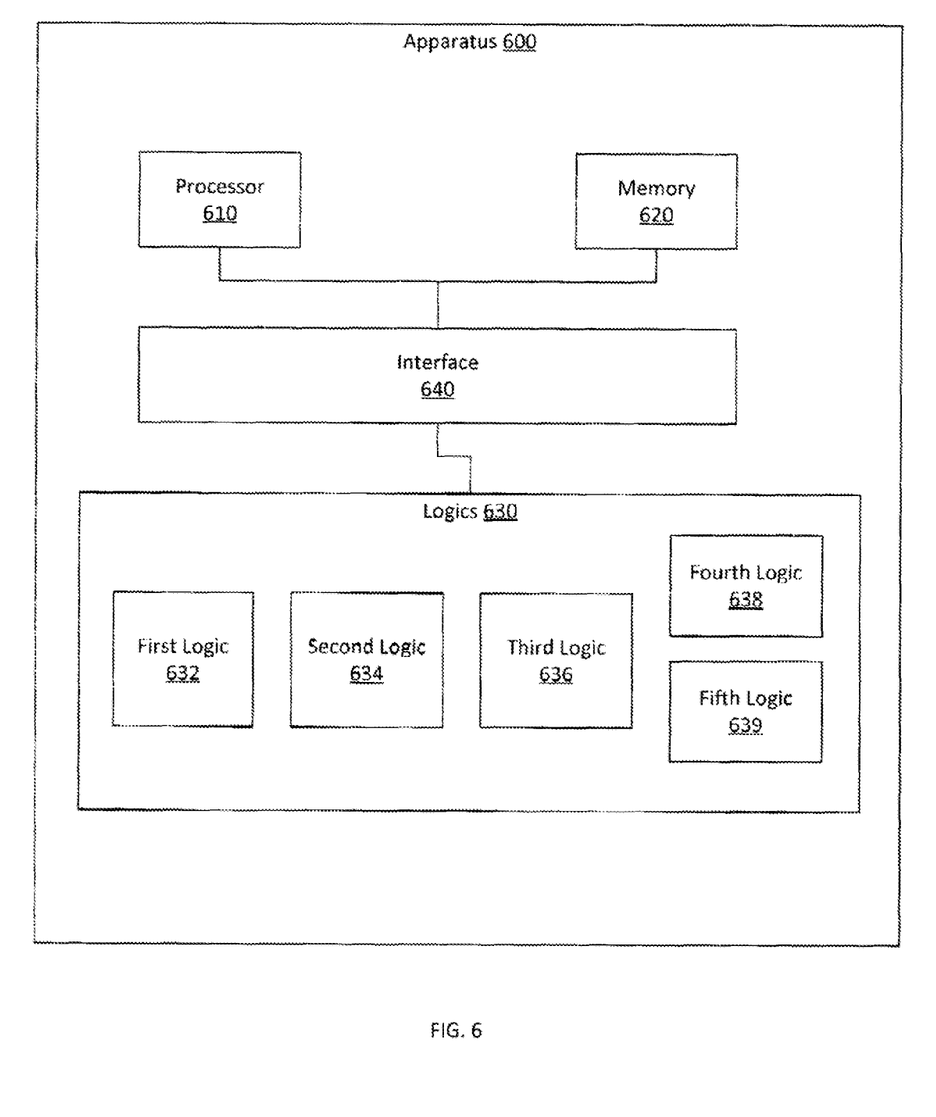
FIG. 6 illustrates an example apparatus associated with transforming a latent space associated with matrix factorization into a higher dimension metric space where an order associated with an inner product in the latent space is preserved and in which fast scoring may be applied in an improved time period.

FIG. 6 illustrates an apparatus 600 that is similar to apparatus 500 (FIG. 5). For example, apparatus 600 includes a processor 610, a memory 620, a set of logics 630 (e.g., 632, 634) that correspond to the set of logics 530 (FIG. 5) and an interface 640. However, apparatus 600 includes an additional third logic 636. The third logic 636 may be configured to perform additional processing. For example, third logic 636 may be configured to identify vector pairs in the M-dimensional metric space to rank. In one embodiment, the vector pairs are identified based, at least in part, on Euclidean distance between a reference vector and a candidate vector. In one embodiment, the vector pairs are identified based, at least in part, on a local sensitivity hash (LSH) technique or a k-dimensional tree technique, k being an integer greater than one.

In another embodiment, third logic 636 may be configured to apply a kernel function to find the result of $u_i = \mathrm{argmax}_i K(u_i, v_j)$, where the kernel function is a function $K(u,v)$ such that there exists a mapping $\phi: X \to H$ such that $K(u,v) = \phi(u) \cdot \phi(v)$, where the inner product takes place at the Hilbert space H. When third logic 636 is configured in this way, the mapping performed by second logic 634 facilitates finding the maximizers of the inner products when mapped to the Hilbert space. The mathematical concept of a Hilbert space generalizes the notion of a Euclidean space. A Hilbert space extend the methods of vector algebra and calculus from the two-dimensional Euclidean plane or three-dimensional Euclidean volume to spaces with other dimensions. A Hilbert space is an abstract vector space that possesses the structure of an inner product to facilitate measuring length and angle.

Apparatus 600 may also include a fourth logic 638. Fourth logic 638 may be configured to produce a ranking for a vector pair. The ranking may represent a strength of a relationship between entities associated with the vectors in the vector pair. Recall that the strength of the relationship between entities was found using an inner product relationship in the latent space and that the ordering present in the latent space is preserved in the metric space. The ranking may indicate if a candidate vector is closest to a reference vector, second closest to the reference vector, and so on.

Apparatus 600 may also include a fifth logic 639. Fifth logic 639 may be configured to make a recommendation of an item or a recommendation of a user based, at least in part, on the ranking for the vector pair. In one embodiment, the recommendation may only be made for the highest ranking for the vector pair, for a highest number of vector pairs, for a highest percentage of the vector pairs, or when other selection thresholds are satisfied. In one embodiment, the ranking itself may be insufficient to justify a recommendation. Thus, in one embodiment, the fifth logic 639 may be configured to compute an original score for a vector pair by performing an inner product operation in the non-metric latent space. The recommendation may then be based, at least in part, on the original score. For example, the fifth logic 639 may be configured to make the recommendation upon determining that the original score exceeds a recommendation threshold.

Figure 7:
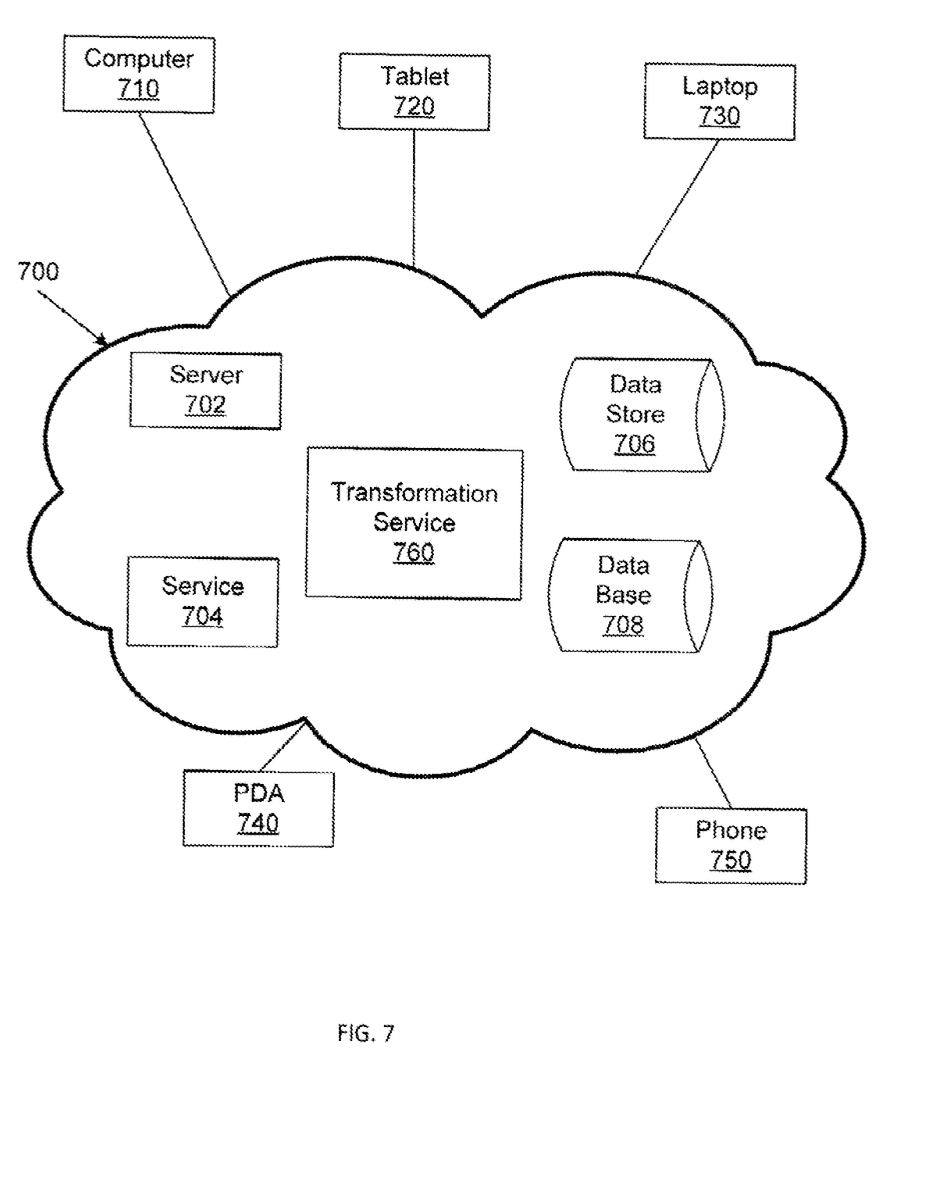
FIG. 7 illustrates an example cloud operating environment in which a recommendation system with a metric transformation may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example transformation service 760 residing in the cloud. The transformation service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the recommendation service 760.

FIG. 7 illustrates various devices accessing the transformation service 760 in the cloud. The devices include a computer 710, a tablet 720, a laptop computer 730, a personal digital assistant 740, and a mobile device (e.g., cellular phone, satellite phone, wearable computing device) 750. The transformation service 760 may produce a recommendation for a user concerning a potential acquisition (e.g., purchase, rental, borrowing). Additionally, the transformation service 760 may also provide answers to the targeting problem, the matchmaking problem, or the item-to-item problem. The transformation service 760 may apply fast retrieve methodologies (e.g., LSH, K-D trees) to a data space produced by transforming a non-metric latent space associated with matrix factorization to a higher dimension metric space where inner-product order was preserved It is possible that different users at different locations using different devices may access the transformation service 760 through different networks or interfaces. In one example, the transformation service 760 may be accessed by a mobile device 750. In another example, portions of transformation service 760 may reside on a mobile device 750.

Figure 8:
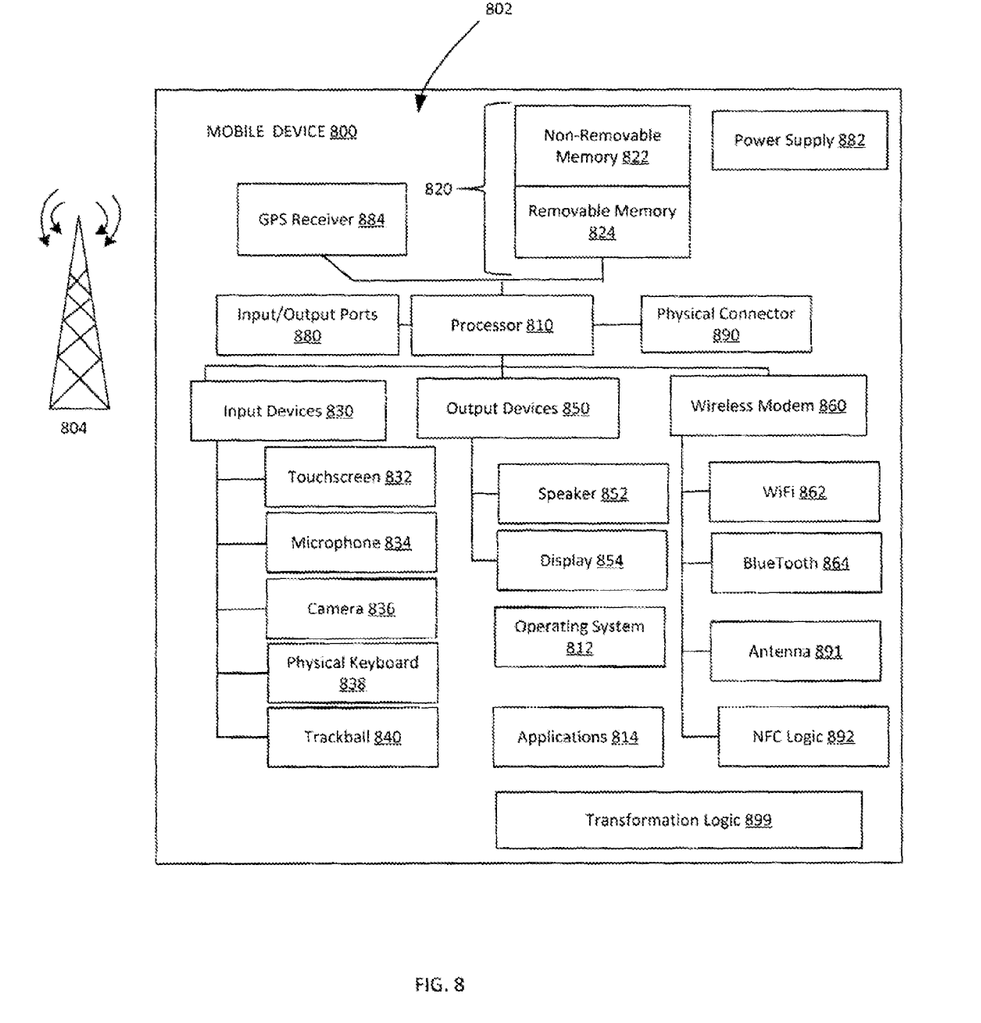
FIG. 8 is a system diagram depicting an exemplary mobile communication device configured to participate in a recommendation system with a metric transformation.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer. Personal Digital Assistant (PDA), wearable computing device, etc.) and may allow wireless two-way communications with one or more mobile communications networks 804, such as a cellular or satellite network.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include recommendation applications, transformation applications, fast retrieve applications, mobile computing applications (e.g., email applications, calendars, contact managers, web browsers, messaging applications), video games, or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include vectors, recommendations, transformation rules, or other data. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting gestures to provide input to a recommendation application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC).

The mobile device 800 may include at least one input/output port 880, a power supply 882, a satellite navigation system receiver 884, such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include transformation logic 899 that is configured to provide a functionality for the mobile device 800. For example, transformation logic 899 may provide a client for interacting with a service (e.g., service 760, FIG. 7). Portions of the example methods described herein may be performed by transformation logic 899. Similarly, transformation logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store electronic data. A data store may be, for example, a database, a table, a file, a list, a queue, a heap, a memory, a register, and other physical repository. In different examples, a data store may reside in one logical or physical entity or may be distributed between two or more logical or physical entities. Storing electronic data in a data store causes a physical transformation of the data store.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . , ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processor;
   a memory configured to store data representing vectors in an N-dimensional non-metric latent space and to store data representing vectors in an M-dimensional metric space, where N is an integer greater than two, and M is an integer greater than N;
   a set of logics configured to transform the non-metric latent space to the metric space; and
   an interface to connect the processor, the memory, and the set of logics;
   the set of logics comprising:
      a first logic configured to perform matrix factorization on first entities and second entities to produce the N-dimensional non-metric latent space in which the first entities and the second entities are embedded, where producing the N-dimensional non-metric latent space includes storing in the memory data representing a vector associated with an entity; and
      a second logic configured to produce the M-dimensional metric space from the non-metric latent space by performing an order preserving transform on the non-metric latent space, where producing the M-dimensional metric space includes storing data representing a vector in the memory, where the second logic is configured to perform the order preserving transform by causing a maximizer of an inner-product operation between two vectors in the latent space to be a minimizer of a Euclidean distance between two corresponding vectors in the metric space.

2. The apparatus of claim 1, comprising:
   a third logic configured to identify vector pairs in the M-dimensional metric space to rank, where the vector pairs are identified based, at least in part, on Euclidean distance between a reference vector and a candidate vector.

3. The apparatus of claim 2, where the vector pairs are identified based, at least in part, on a local sensitivity hash (LSH) technique or a k-dimensional tree technique, k being an integer greater than one.

4. The apparatus of claim 3, comprising:
   a fourth logic configured to produce a ranking for a vector pair, where the ranking represents a strength of a relationship between entities associated with the vectors in the vector pair.

5. The apparatus of claim 4, where the first entities represent users and the second entities represent items, where the users are represented by vectors $u_1, \ldots, u_n$ and the items are represented by vectors $v_1, \ldots, v_m$ where n is an integer representing the number of items and m is an integer representing the number of users.

6. The apparatus of claim 5, where the vector pairs are related to solving:
   given i, find $j$=arg max $u_i \cdot v_j$,
   given i, find $i'$=arg max $u_i \cdot u_{i'}$,
   given j find $i$=arg max $u_i \cdot v_j$, or
   given j find $j'$=arg max $v_j \cdot v_{j'}$.

7. The apparatus of claim 6, where the second logic is configured to perform the order preserving transform by processing a real space R where $R_u \geq \max\|u_i\|$ and $R_v \geq \max\|v_j\|$.

8. The apparatus of claim 7, where the second logic is configured to perform the order preserving transform as controlled by the definition of $\hat{u}_i$ and $\hat{v}_j$ as:

$$\hat{u}_i = (0, \sqrt{R_u^2 - \|u_i\|^2}, u_i)$$

$$\hat{v}_j = (\sqrt{R_v^2 - \|v_j\|^2}, 0, v_j)$$

where $\|\hat{u}_i\| = R_u$ and $\|\hat{v}_j\| R_v$.

9. The apparatus of claim 8, where the second logic is configured to perform the order preserving transform as controlled by:

$$\|\hat{u}_i - \hat{v}_j\|^2 = \|\hat{u}_i\|^2 + \|\hat{v}_j\|^2 - 2u_i \cdot v_j = R_u^2 + R_v^2 - 2u_i \cdot v_j,$$

where
   $\bar{u}_i$ is defined as $(0,0,u_i)$ and $\bar{v}_j$ is defined as $(0,0,v_j)$.

10. The apparatus of claim 5, comprising a fifth logic configured to make a recommendation of an item or a recommendation of a user based, at least in part, on the ranking for the vector pair.

11. The apparatus of claim 10, where the fifth logic is configured to compute an original score for the vector pair by performing an inner product operation in the non-metric latent space, and to make the recommendation based, at least in part, on the original score.

12. The apparatus of claim 11, where the fifth logic is configured to make the recommendation upon determining that the original score exceeds a recommendation threshold.

13. The apparatus of claim 1, comprising a third logic configured to apply a kernel function to find the result of $u_i = \mathrm{argmax}_j K(u_i, v_j)$,
where the kernel function is a function $K(u,v)$ such that there exists a mapping $\phi : X \to H$ such that $K(u,v) = \phi(u) \cdot \phi(v)$, where the inner product takes place at the Hilbert space H.

14. A method for producing a recommendation, comprising:
producing first electronic data associated with a non-metric latent space, where the data associated with the non-metric latent space is produced using a matrix factorization process for vectors associated with users and vectors associated with items, where the matrix factorization process includes assigning a user i of F users a vector $u_i$ in the latent space and assigning an item j of G items a vector $v_j$ in the latent space, where i, j, F, and G are integers, where i is less than or equal to F and j is less than or equal to G, where the elements of a vector measure the extent to which the entity associated with the vector possesses the factors associated with the dimensions in the matrix;
producing second electronic data associated with a metric space, where the metric space is produced from the non-metric latent space by applying a vector space transform to the latent space, where the transform preserves in the metric space the order of an inner product operation defined for the latent space, and where the metric space has a higher dimensionality than the non-metric space;
producing a ranking for a selected number of vector combinations in the higher dimension metric space, where the ranking is a function of a scoring process applied to the vectors, where the scoring process depends, at least in part, on the Euclidean distance between vectors, and where the rankings are associated with evaluating:
a user-to-item relation defined by: given i, find j=arg max $u_i \cdot v_j$,
a targeting relation defined by: given j, find i=arg max $u_i \cdot v_j$,
a matchmaking relation defined by: given i, find i'=arg max $u_i \cdot u_{i'}$, or
an item to item relation defined by: given j, find j'=arg max $v_j \cdot v_{j'}$,
and,
producing the recommendation based, at least in part, on the rankings of the selected number of vector combinations.

15. The method of claim 14, comprising:
storing a value for the ranking, where the value is computed by performing an inner product operation on vectors associated with the ranking, where the vectors are stored in the latent space, and
upon determining that the value exceeds a recommendation threshold, producing the recommendation.

16. The method of claim 14, where the selected number of vector combinations is configured to cover less than a configurable percentage of the metric space.

17. The method of claim 14, where the vector space transform causes a maximizer of an inner-product operation between two vectors in the latent space to be a minimizer of a Euclidean distance between two corresponding vectors in the metric space.

18. The method of claim 17, where the vector space transform operates in a real space R where $R_u \geq \max\|u_i\|$ and $R_v \geq \max\|v_j\|$.

19. The method of claim 18, where the vector space transform operates as controlled by:

$$\hat{u}_i = (0, \sqrt{R_u^2 - \|u_i\|^2}, u_i)$$

$$\hat{v}_j = (\sqrt{R_v^2 - \|v_j\|^2}, 0, v_j)$$

where $R_u \geq \|u_i\|$ and $R_v \|v_j\|$, and as controlled by:

$$\|\hat{u}_i - \hat{v}_j\|^2 = \|\hat{u}_i\|^2 + \|\hat{v}_j\|^2 - 2u_i \cdot v_j = R_u^2 + R_v^2 - 2u_i \cdot v_j,$$

where
$\bar{u}_i$ is defined as $(0, 0, u_i)$ and is defined as $(0, 0, v_j)$.

20. A computer-readable non-transitory storage medium storing computer-executable instructions that when executed by a computer control the computer to perform a method, the method comprising:
producing first electronic data associated with a non-metric latent space, where the data associated with the non-metric latent space is produced using a matrix factorization process for vectors associated with users and vectors associated with items, where the matrix factorization process includes assigning a user i of F users a vector $u_i$ in the latent space and assigning an item j of G items a vector $v_j$ in the latent space, where i, j, F, and G are integers, where i is less than or equal to F and j is less than or equal to G;
producing second electronic data associated with a metric space, where the metric space is produced from the non-metric latent space by applying a vector space transform to the latent space, where the metric space has a higher dimensionality than the non-metric space, and where the vector space transform causes a maximizer of an inner-product operation between two vectors in the latent space to be a minimizer of a Euclidean distance between two corresponding vectors in the metric space;
producing a ranking for a selected number of vector combinations in the higher dimension metric space, where the ranking is a function of a scoring process applied to the vectors, where the scoring process depends, at least in part, on the Euclidean distance between vectors, where the selected number of vector combinations is configured to cover less than a configurable percentage of the metric space, and where the rankings are associated with evaluating:
a user-to-item relation defined by: given i, find j=arg max $u_i \cdot v_j$,
a targeting relation defined by: given j, find i=arg max $u_i \cdot v_j$,
a matchmaking relation defined by given i, find i'=arg max $u_i \cdot u_{i'}$, or
an item to item relation defined by: given j, find j'=arg max $v_j \cdot v_{j'}$,
storing a value for the ranking, where the value is computed by performing an inner product operation on vectors associated with the ranking, where the vectors are stored in the latent space, and
upon determining that the value exceeds a recommendation threshold, producing the recommendation,
where the vector space transform operates in a real space R where $R_u \geq \max\|u_i\|$ and $R_v \geq \max\|v_j\|$,
where the vector space transform operates as controlled by:

$$\hat{u}_i = (0, \sqrt{R_u^2 - \|u_i\|^2}, u_i)$$

$$\hat{v}_j = (\sqrt{R_v^2 - \|v_j\|^2}, 0, v_j)$$

$$\|\hat{u}_i - \hat{v}_j\|^2 = \|\hat{u}_i\|^2 + \|\hat{v}_j\|^2 - 2u_i \cdot v_j = R_u^2 + R_v^2 - 2u_i \cdot v_j,$$

where $\|\hat{u}_i\|=R_{u_i}$, $\|\hat{v}_j\|=R_{v_j}$, $\bar{u}_i$ is defined as $(0,0,u_i)$ and $\bar{v}_j$ is defined as $(0,0,v_j)$.

\* \* \* \* \*